US005778038A

United States Patent [19]

Brandt et al.

[11] Patent Number: 5,778,038

[45] Date of Patent: Jul. 7, 1998

[54] COMPUTERIZED TOMOGRAPHY SCANNER AND METHOD OF PERFORMING COMPUTERIZED TOMOGRAPHY

[75] Inventors: Achi Ezer Brandt, Rehovot, Israel; Jordan Mann, Cambridge, Mass.; Matvei Brodski, Willburn, N.J.

[73] Assignee: Yeda Research and Development Co., Ltd., Rehovot, Israel

[21] Appl. No.: 659,595

[22] Filed: Jun. 6, 1996

[51] Int. Cl.[6] .......... A61B 6/03

[52] U.S. Cl. .......... 378/4; 378/901

[58] Field of Search .......... 378/4, 19, 901

[56] References Cited

U.S. PATENT DOCUMENTS

| | | | |
|---|---|---|---|
| 4,833,698 | 5/1989 | Flannery et al. | 378/19 |
| 4,891,829 | 1/1990 | Deckman et al. | 378/4 |
| 4,991,093 | 2/1991 | Roberge et al. | 364/413.15 |
| 5,099,846 | 3/1992 | Hardy | 128/653.1 |
| 5,391,877 | 2/1995 | Marks | 250/363.04 |
| 5,398,684 | 3/1995 | Hardy | 128/653.1 |
| 5,402,462 | 3/1995 | Nobuta | 378/20 |
| 5,414,622 | 5/1995 | Walters | 364/413.19 |

OTHER PUBLICATIONS

"Digital Reconstruction of Multidimensional Signals from Their Projections", by Russell M. Mersereau and Alan V. Oppeheim, Proceedings of the IEEE, vol. 62, No. 10, Oct. 1974.

*Primary Examiner*—David P. Porta
*Assistant Examiner*—David Vernon Bruce
*Attorney, Agent, or Firm*—Evenson, McKeown, Edwards & Lenahan, PLLC

[57] ABSTRACT

An improved computerized tomography method and an apparatus for performing the method are used for construction of visual images of a subject utilizing a Radon transform inversion scheme of lower computational complexity. A multiscale backprojection with a postprocessing step is utilized instead of a conventional backprojection algorithm or direct Fourier method to obtain improved images. Multilevel methods can be applied under weaker regularity requirements than Fourier methods, so the present algorithm can be adjusted to provide different resolutions for different parts of the reconstruction, whether or not the Radon data are equally spaced.

20 Claims, 12 Drawing Sheets

2 OBJECT SCANNER
4 IMAGE RECEIVER
6 IMAGE PROCESSOR
14 ELECTRONIC CALCULATING DEVICE
8 IMAGE MATRIX STORAGE
10 PRINTING DEVICE
12 VIDEO MONITOR

FIG. Ia
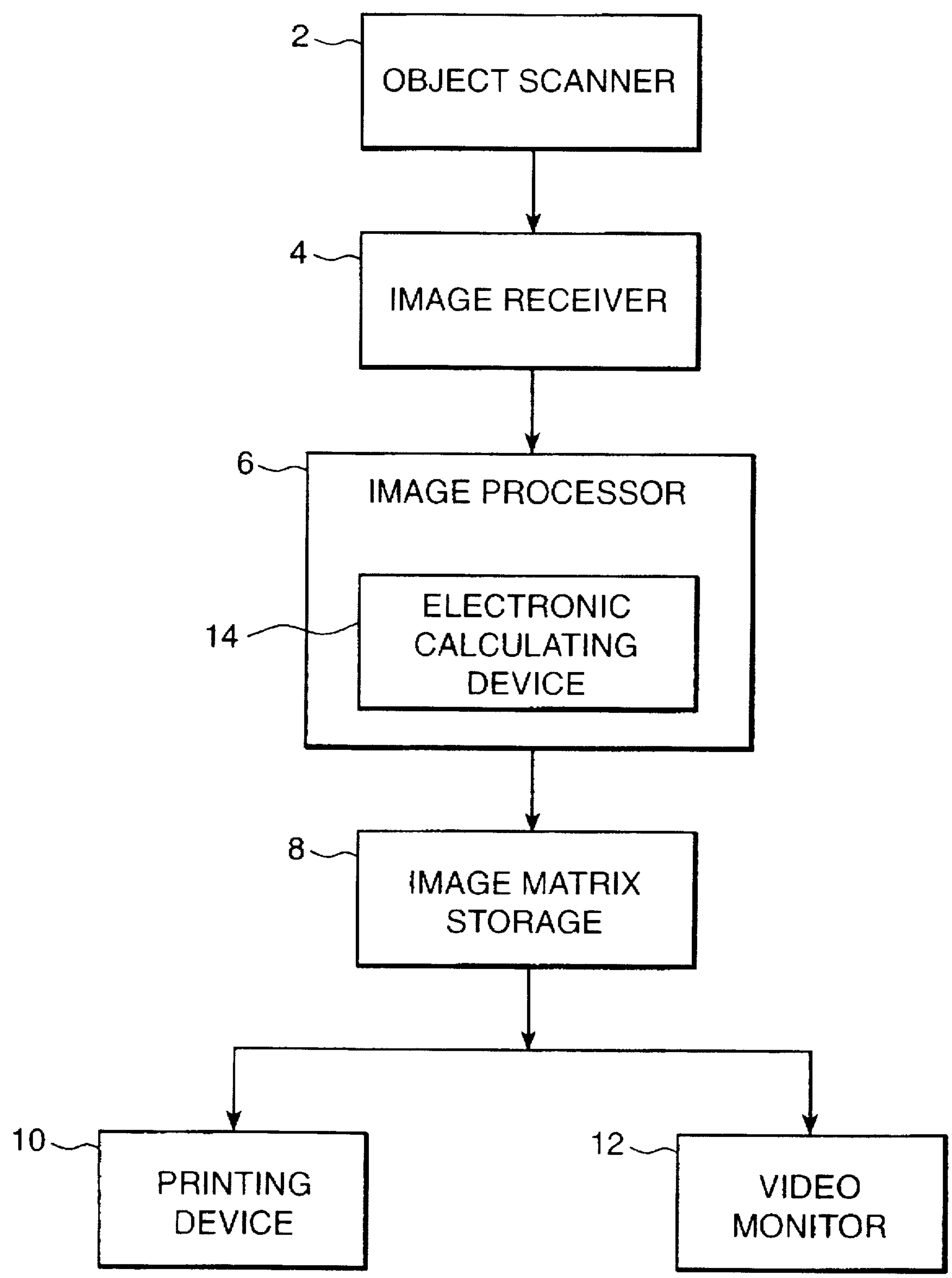

Reconstructions of delta-functions. Values shown represent standard deviation of the best approximating Gaussian and the error of the approximation (for the central 9 points) in the infinity norm

ORIGINAL IMAGE, (2,3), SIGMA = 0.00

ORIGINAL IMAGE FT

NEW RECONSTRUCTION

COMPUTERIZED TOMOGRAPHY SCANNER AND METHOD OF PERFORMING COMPUTERIZED TOMOGRAPHY

FIELD OF THE INVENTION

The present invention relates to computerized tomography scanning, and in particular, to an improved method and apparatus for scanning a subject and constructing a visual image from the sensed tomography data.

BACKGROUND OF THE INVENTION

Computerized tomography has been used for many years, particularly in the medical field, for providing a nondestructive or noninvasive method of generating visual sectional views of a subject, such as a patient, as described in U.S. Pat. No. 5,414,622, the entire contents of which is incorporated herein by reference. These object scanning devices process sensed tomographic data and provide a visual image of the subject as illustrated by U.S. Pat. Nos. 5,398,684; 5,099,846; 5,391,877; 5,414,622 and 5,402,462.

SUMMARY OF THE INVENTION

It is an object of the present invention to provide an improved computerized tomography scanner and an improved method of computerized tomography scanning.

Another object of the present invention is to provide an improved computerized tomography scanner and a method of computerized tomography scanning to produce images of better quality than conventional scanners.

Another object of the present invention is to provide an improved method and apparatus incorporating a transform inversion scheme and a reconstruction algorithm of reduced computational complexity.

It is further an object of the present invention to utilize a multiscale backprojection with postprocessing step instead of a conventional backprojection algorithm or direct Fourier method to obtain improved images.

Yet another object of the present invention is to provide multilevel methods which can be applied under weaker regularity requirements than Fourier methods, so the present algorithm can be adjusted to provide different resolution for different parts of the reconstruction, whether or not the Radon data are equally spaced.

With these and other objects and advantages of the present invention as may become herein apparent, the invention may be more clearly understood from the following description, the attached figures, and the appended claims herein.

BRIEF DESCRIPTION OF THE DRAWINGS

FIG. 1A illustrates is a hardware block diagram in accordance with the present invention.

FIG. 8 shows an image from which Radon data were computed for the purpose of testing different variations of convolution backprojection (CB).

FIG. 9 shows the results of CB with classical backprojection.

FIG. 10 shows the results of CB with multiscale backprojection without postprocessing.

FIG. 11 shows the results of CB with multiscale backprojection, without postprocessing but with doubling of the data by means of interpolation.

DETAILED DESCRIPTION OF THE PREFERRED EMBODIMENT(S)

Over the past decade, numerous attempts have been made to improve the quality and speed of various techniques for computerized tomography scanning or other object image scanning. Such techniques are not limited strictly to the medical field, but may find application in other areas such as synthetic aperture radar image reconstruction. In many synthetic aperture radar systems, samples of the 2-D Fourier transform of a radar reflectivity function are obtained on a polar grid in the Fourier plane, and backprojection may be used to reconstruct the reflectivity function from these samples.

Computerized tomography scanning is a nondestructive or noninvasive method of generating sectional views of an object. Computerized tomography or CT scanning has been applied to industrial processes for flaw detection and other analyses and has been adopted by the medical community for the examination of patients.

Figure 1:
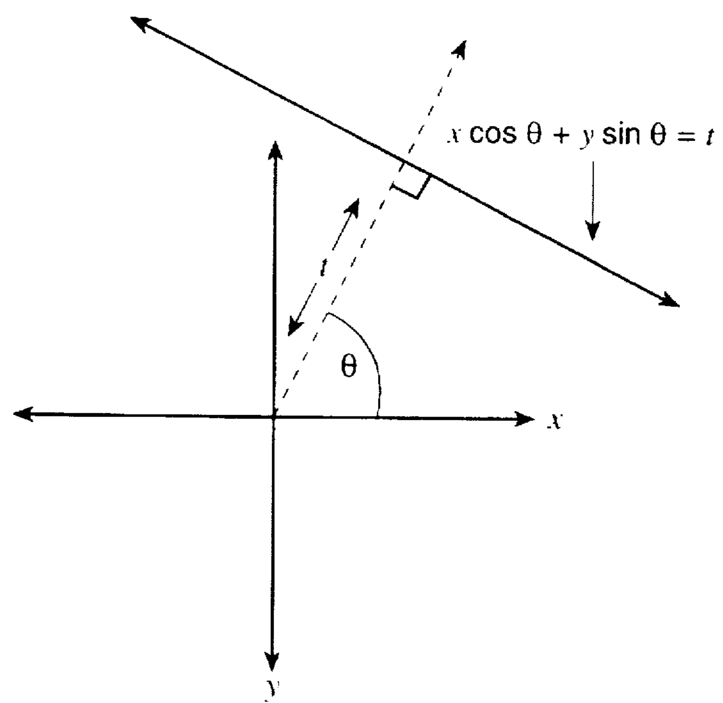
FIG. 1 illustrates the Radon transform of f at angle θ and position t, denoted $P_\theta f(t)$, which is the integral of f on the line x cos θ+y sin θ=t.

FIG. 1A is a diagrammatic representation of the computerized tomography scanner of the present invention. The object scanner 2 includes a stationary frame for mounting a source of electromagnetic radiation, such as X-rays, to scan a subject and an array of detectors or sensors positioned to receive the scanning radiation. The radiation source may produce a fan-shaped beam which is directed through an object to be examined towards the detectors. The detectors or sensors receive radiation from the source and produce data in the form of electric signals indicative of the intensity of the radiation. Because the intensity of the radiation from the source is known, the intensity of the radiation impinging upon an individual sensor is representative of the attenuation of the radiation beam by the object along the path between the radiation source and the detector. The electrical signals indicative of this intensity from each of the individual detectors or sensors are subsequently conveyed to a projection data memory 4 for storage.

The stored signals are inputted to an image processor 6 for processing the representation of the radiation attenuation from the individual sensors. A calculating device 14 within the image processor computes a matrix of samples from the signals supplied by the sensors or detectors. The processing means provides a matrix of samples of the image which are stored in the image matrix storage 8. Each detector sampling represents attenuated data collected along one of the paths of the projection from the radiation source. The image matrix storage element is connected to a video monitor 12 and printing device 10 so that a visual image can be produced.

The Radon Transform is a known mathematical operation which is generally equivalent to computing the integral of a function along a given line and has been widely used in computerized tomography. Thus, the inversion of the operation is particularly useful in making radiographs of plane sections of a body or object. The purpose of tomography is to show detail in a predetermined plane of the body. Reconstruction of a function of two or three variables from its Radon transform has proven vital in computed tomography (CT), nuclear magnetic resonance imaging, astronomy, geophysics, and a number of other fields. S. R. Deans, *The Radon Transform and Some of its Applications*, New York: John Wiley and Sons, 1983. One of the best known reconstruction algorithms is the convolution backprojection method (CB), which is widely used in commercial CT devices (with rebinning for divergent-beam projections); G. Herman, *Image Reconstruction from Projections: The Fundamentals of Computerized Tomography*, New York: Academic Press, 1980). Recently, it has been applied to spotlight-mode synthetic aperture radar image reconstruction, in which the conventional method is the direct Fourier method (DF), i.e., Fourier domain interpolation followed by 2-D FFT.

Convolution Backprojection (CB) is preferred to DF since the former provides better images. R. Mersereau and A. Oppenheim, "Digital reconstruction of multidimensional signals from their projections," *Proceedings of the IEEE*, vol. 62, no. 10, October, 1974, pp. 1319–1338. However, since the backprojection part of CB raises the computational complexity of the method to $O(N^3)$, while DF's complexity is $O(N^2 \log N)$, there has been interest in finding effective implementation of DF.

By way of further background, there are a number of mathematical considerations which should be considered with respect to the invention described below.

For the purpose of discussion, let $f$ be an absolutely integrable function of two variables. $P_\theta f(t)$, the Radon transform of the function at angle θ, is then defined by $$P_\theta f(t) = \int_{-\infty}^{\infty} f(t\cos\theta - \tau\sin\theta,\ t\sin\theta + \tau\cos\theta)\,d\tau. \tag{1}$$

This is the integral of $f$ along the line $$x\cos\theta + y\sin\theta = t$$

in the x-y plane. (See FIG. 1). In many imaging technologies, such as CT, the challenge is to compute $f$, or an approximation to it, given samples of $P_\theta f(t)$ for finitely many values of θ and t.

To understand CB, which is meant to solve this problem, one needs the Fourier transform. For $f \in L^1(\mathbb{R}^d)$, the Fourier transform $\hat{f}$ of $f$ is defined by $$\hat{f}(u) = \frac{1}{(2\pi)^{d/2}} \int_{\mathbb{R}^d} f(x) e^{ix\cdot u}\,dx,$$

for all $u \in \mathbb{R}^d$. For any θ, $f \in L^1(\mathbb{R}^2)$ implies that $P_\theta f$ is well defined and belongs to $L^1(\mathbb{R}^1)$, and thus $\widehat{P_\theta F}(u)$, the Fourier transform of $P_\theta f(t)$ with respect to t, is also well defined. Many methods for reconstructing a function from its Radon transform, including CB, rely on the Radon Slice Theorem, which states that $$\widehat{P_\theta f}(\rho) = \sqrt{2\pi}\,\hat{f}(\rho\cos\theta, \rho\sin\theta) \tag{2}$$

Thus, if $f(x,y)$ is the image function, the 2-D Fourier transform of the image can be sampled by sampling the Fourier transform of the Radon transform of the image for different values of ρ and θ.

One way to reconstruct $f$ from its Radon transform is to compute $\hat{f}$ using (2) for as many values of η and θ as possible and then perform a 2-D inverse Fourier transform. Algorithms based on this idea are called direct Fourier methods (DF). CB, however, uses the following approach. The Fourier transform inversion formula for functions of 2 variables can be written in polar coordinates as $$f(x, y) = \frac{1}{2\pi} \int_0^{\pi} \int_{-\infty}^{\infty} \hat{f}(\rho\cos\theta, \rho\sin\theta) e^{i\rho(x\cos\theta + y\sin\theta)} |\rho|\,d\rho\,d\theta.$$

By the Radon Slice Theorem (2), this equals $$\frac{1}{(2\pi)^{3/2}} \int_0^{\pi} \int_{-\infty}^{\infty} \widehat{P_\theta f}(\rho) e^{i\rho(x\cos\theta + y\sin\theta)} |\rho|\,d\rho\,d\theta.$$

In most applications, values of $P_\theta f$ or $\widehat{P_\theta f}$ are obtained from the physical data. Using the $\widehat{P_\theta f}$ values, one may compute a function $\widetilde{P_\theta f}$, defined by $$\widetilde{P_\theta f}(u) = \int_{-\infty}^{\infty} \widehat{P_\theta f}(\rho) e^{i\rho u} |\rho|\,d\rho, \tag{3}$$

and then $$f(x, y) = \frac{1}{(2\pi)^{3/2}} \int_0^{\pi} \widetilde{P_\theta f}(x\cos\theta + y\sin\theta)\,d\theta, \tag{4}$$

which means that $f(x, y)$ can be reconstructed from the $P_0 f$ values, given these values for all θ.

Of course, in actual applications, $P_\theta f(t)$ is known for only a finite number of values of θ and t, and $f$ is to be computed at a finite set of points, or pixels, (x,y). Let us assume that the pixels $(x_i, y_i)$, to be computed lie inside a circle inscribed in an N×N square grid, with a distance d between adjacent pixel centers in both the horizontal and vertical directions, that there are Q evenly-spaced angles $\theta_j$ at which $P_\theta f$ is known, and that at each such angle $\theta_j$, $P_\theta f(t)$ is known at N evenly spaced values $t_k$ of t, the difference between consecutive values $t_k$ and $t_{k+1}$ being d as well. Limiting the region of reconstruction to the inscribed circle, N samples of the Radon transform in any direction are enough to cover the region. This exposition assumes that Q is a power of 2, though the new algorithm can clearly be generalized to the case of arbitrary Q.

Computation of $\widetilde{P_\theta f}$ is called the convolution step because multiplying two functions together in the Fourier domain and taking the inverse Fourier transform of the result is associated with convolution. The Fourier transform and inverse Fourier transform required in (3) for this step are approximated in practice using the discrete Fourier transform (DFT) and its inverse. Since there are N values of $P_\theta f(t)$ for each value of θ, the computation of $\widetilde{P_\theta f}$ for a single value of θ is O(N log N) using the Fast Fourier Transform (FFT), and since there are Q values of θ, the entire convolution step is O(QNlogN). If, as is usually assumed, Q≈N, then the convolution step is $O(N^2 \log N)$.

The integral with respect to θ in (4) is replaced in practice by summation over all available values of θ. Since there are $O(N^2)$ pixels at which summation is required, and Q values of θ, this final step of computing the right side of (4) is clearly $O(QN^2)$, or, if Q≈N, $O(N^3)$. Since the contribution of $P_\theta f$ to a pixel (x,y) depends only on the quantity x cos θ+y sin θ, $P_\theta f(u)$ is said to be "smeared" or "backprojected" along the line x cos θ+y sin θ=u for each value of u. That is, it is added to every pixel lying on that line. Therefore, this final step is called the backprojection step. Although the concept of backprojection suggests an algorithm with a different loop structure than the one suggested by (4)—namely, (4) suggests an outer loop to go through all the pixels and an inner loop to go through the values of θ, whereas the backprojection concepts suggests the reverse—the backprojection concept does not change the computational complexity. Although DF is $O(N^2 \log N)$, commercial CT scanners have traditionally used CB, despite its higher computational complexity, in part because of the superior quality of the images it produces.

The present invention represents an improvement over conventional computerized tomography scanners and methods for tomography scanning to provide an improved visual image with lower computational complexity. In the present apparatus and method, the Radon projection samples from the detectors are processed by the following steps:

(a) filtering the samples of each Radon projection sample vector $r^i$, where i=1, . . . , Q, by:

i. computing the discrete Fourier transform $\hat{r}^i$ of $r^i$ using an algorithm of order N log N, where N is the length of the vector;

ii. multiplying the jth element of $\hat{r}^i$ by j, for j<N/2, and multiplying the jth element of $r^i$ by N−j, for j≧N/2, where the elements of $\hat{r}^i$ are numbered 0 through N−1; and iii. computing the inverse discrete Fourier transform $g_i^0$ of the modified $\hat{r}^i$ using an algorithm of order N log N; and thereafter (b) performing the kth level of merges, for k=1, . . . , $\log_2 Q$, by computing the grid $g_l^k$, for l=1, . . . , $Q/2^k$, by merging $g_{2l-1}^{k-1}$ and $g^{k-1}_{2l}$ by means of rotation of coordinates, interpolation, and addition as described in detail hereinafter.

The present invention comprises a fast, multiscale backprojection method and postprocessing method for execution by an electronic calculating device. Referring now in detail to the fast multiscale backprojection method or transform-convolution-backprojection method of the present invention.

The multilevel backprojection method relies on the following reasoning. In the standard backprojection algorithm, a single N×N grid is used to sum the appropriate values of $\widetilde{P_{\theta j} f}$, for j=1, . . . , Q, for each pixel. One can, however, start with Q grids $g_j^0$, j=1, . . . , Q, and for each j project $P_{\theta j} f$ only onto $g_j^0$. Later, the Q different grids can be added together pixelwise to produce the final image. This approach can be used to save computation in the following way.

In what follows, for all i and j, $f_j^i$ will be a function of two continuous variables x and y, and $g_j^i$ will be the set of samples of $f_j^i$ at a finite set of discrete points in the x -y plane. With every grid $g_j^i$ is associated an angle $\theta_j^i$, and the points in the x -y plane at which samples of $f_j^i$ are computed for storage in $g_j^i$ are located in at the intersections of two sets of parallel lines, one set parallel to the vector ($\cos\theta_j^i$, $\sin\theta_j^i$) and the other set perpendicular to it. The grids $g_j^0$, for various j, will be called the zeroth-level grids, the grids $g_j^1$, for various j, will be called the first-level grids, etc.

Given two functions $f_j^l$ and $f_k^l$, and their respective sample grids $g_j^l$ and $g_k^l$, if $f_m^{l+1}$ is defined as the sum of $f_j^l$ and $f_k^l$, then the method of the invention computes $g_m^{l+1}$, the grid of samples of $f_m^{l+1}$, by interpolation from $g_j^l$ and $g_k^l$. Computation of $g_m^{l+1}$ is called a "grid merge".

For j=1, . . . , Q, let $$f_j^0(x, y)= \widetilde{P_{\theta j} f}\ (x \cos \theta+y \sin \theta).$$

Figure 2:
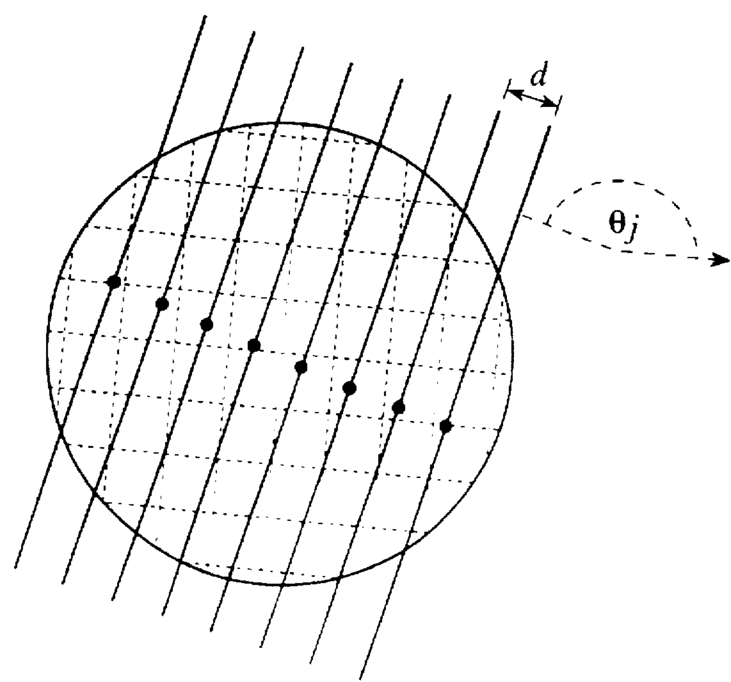
FIG. 2 shows a construction of zero-level grid $g_j^0$, which contains the results of a single backprojection, that of $P_{\theta_j} f$, according to a preferred embodiment of the present invention.

I.e., $f_j^0$ is the function of two variables resulting from the backprojection of $\widetilde{P_{\theta j} f}$ along the lines x cos θ+y sin θ=t, for different values of t, in the x-y plane. Clearly $f_j^0$ does not vary along such lines, and therefore, when collecting samples of $f_j^0$ to form the grid $g_j^0$, it is sufficient to compute one sample and store it in the grid for each of the N values of t at which $P_{\theta j} f(t)$ has been computed, rather than computing and storing $N^2$ samples. See FIG. 2. As shown in FIG. 2, although $g_j^0$ is meant to contain the samples of the function $f_j^0$ defined on a disk in the plane, and the disk contains $O(N^2)$ pixels, shown in the figure as the intersections of dotted lines, it is sufficient to compute and store in $g_j^0$ samples of $f_j^0$ taken at only O(N) points, shown in the figure as black dots, since $f_j^0$ only varies in the direction (cos $\theta_j$, sin $\theta_j$). In fact, $g_j^0$ is merely a 1-D array containing all the computed values of $\widetilde{P_{\theta j} f}$, and is compiled by the convolution part of the CB algorithm. Thus, although the backprojection begins with Q grids instead of one, the total number of samples stored is O(NQ). The distance between sample points of $f_j^0$ for any j is d, the distance between points where $\widetilde{P_{\theta j} f}$ is sampled.

Eventually, the various initial functions $f_j^0$ must be added together to form the final image. As addition is commutative and associative, they may be added together in any order, and the method of the invention chooses an order that reduces the number of necessary computations. Since Q is even by assumption, the first level of grid merges will consist of adding together pairs of functions $f_j^0$, $f_k^0$ such that $\theta_j$ and $\theta_k$ are close to each other, and thus the direction in which $f_j^0$ is constant is close to the direction in which $f_k^0$ is constant. The sum of these two functions, $f_l^1$, will therefore vary slowly in a certain direction, and thus it will only be necessary to store samples of $f_l^1$ from a handful of widely-spaced points along each line parallel to the "slow" direction.

Specifically, it may be assumed without loss of generality that $0\leqq\theta_j<\pi$ for all j and that the $\theta_j$ are ordered in such a way that $\theta_j<\theta_{j+1}$ for all j=1, . . . , Q−1. for all j=1, . . . Q, let $\theta_j^0=\theta_j$. For all k from 1 to Q/2, one adds together the functions $f_{2k-1}^0$ and $f_{2k}^0$ to obtain $f_k^1$. Since for any j, $f_j^0$ does not vary in the direction (−sin $\theta_j$, cos $\theta_j$), it follows that $f_{2k-1}^0$ and $f_{2k}^0$ vary slowly in the direction (−sin $\theta_k^1$, cos $\theta_k^1$), where $\theta_k^1$ is the average of $\theta_{2k-1}$ and $\theta_{2k}$. Therefore, $f_k^1$ varies slowly in the (−sin $\theta_k^1$, cos $\theta_k^1$) direction, and when forming $g_k^1$, it is only necessary to store samples of $f_k^1$ from a few widely-spaced points along each line in that direction. The spacing between sample points in the "fast" direction, i.e., $(\cos\theta_k^1, \sin\theta_k^1)$, will again be d. The samples are computed from $g_{2k-1}^0$ and $g_{2k}^0$ by interpolation.

Although the first-level grids $g^1_k$ each contain more samples than any of the zeroth-level grids $g^0_k$, there are half as many first-level grids as zeroth-level grids, and it will be shown that the total number of samples in any level of grids is $O(N^2+QN)$.

By similar reasoning, for $l=1, \ldots, Q/4$, add $f_{2l-1}^1$ and $f_{2l}^1$ together to obtain $f_l^2$ in such a way that $f_l^2$ varies slowly in the direction $(-\sin\theta_l^2, \cos\theta_l^2)$, where $\theta_l^2$ is the average of $\theta_{2l-1}^1$ and $\theta_{2l}^1$, and consequently, when computing and storing samples of $f_l^2$ to form $g_l^2$, it is only necessary to store samples from a few widely-spaced points in the direction $(-\sin\theta_l^2, \cos\theta_l^2)$. The spacing between sample points in the fast direction, i.e., $(\cos\theta_l^2, \sin\theta_l^2)$ will again be d. $f_l^2$ will not vary as slowly in its "slow" direction as $f_{2l}^1$ varies in its "slow" direction, and therefore $g_l^2$ will require more sample points in its slow direction than $g_{2l}^1$ requires in its slow direction. Nevertheless, there are half as many second-level grids $g_l^2$ as there are first-level grids $g_k^1$, and as will be shown, the total number of point values that must be computed and stored for all the grids at any one level of merges is $O(N^2+QN)$. Samples of $f_l^2$ to be stored in $g_l^2$ are computed from $g_{2l-1}^2$ and $g_{2l}^2$ by interpolation.

Continuing in this way, one may construct a sequence of levels of functions and corresponding grids. The functions at the i-th level are constructed from pairs of functions at the (i−1)-th level in such a way that each i-th level function varies slowly in a certain direction, and thus the corresponding grid requires only a few sample points in that direction. At the ($\log_2 Q$)-th level, there is only one grid, and this grid represents the sum of all the original grids $g_j^0$, that is, the sum of all the backprojections of the $P_\theta f$. This grid is therefore the resulting reconstruction. Since $O(N^2)$ operations are needed to build the grids at each level, the overall cost of the algorithm is $O(N^2\log Q)$.

Figure 3A:
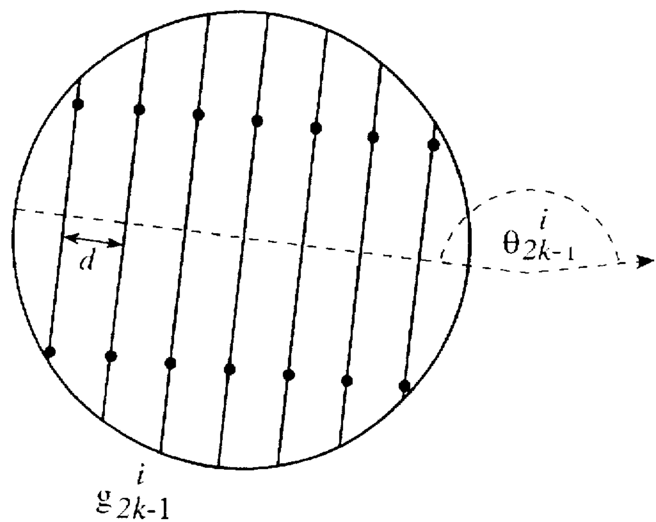
FIGS. 3*a*, 3*b* and 3*c* show the merge of $g_{2k-1}^i$ and $g_{2k}^i$ to form $g_k^{i+1}$ according to a preferred embodiment of the present invention.
Figure 3B:
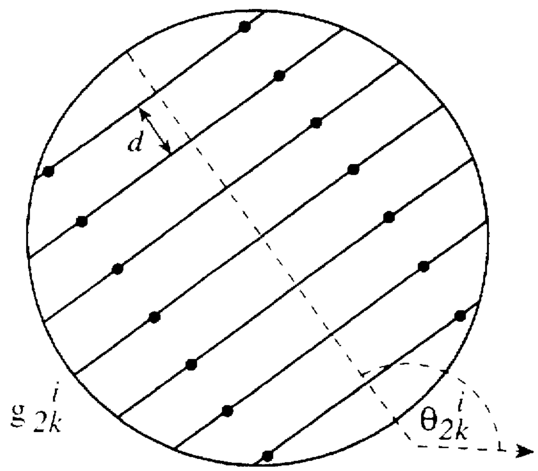
Figure 3C:
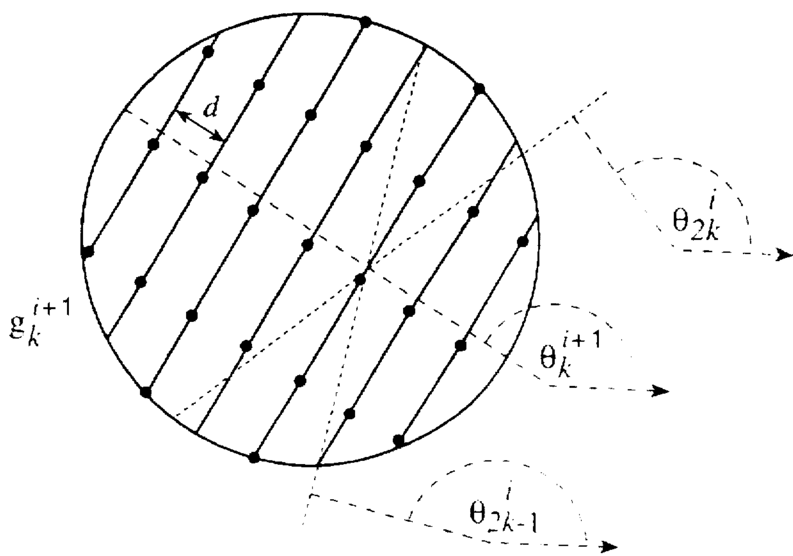

This is shown in FIG. 3 which illustrates a merge of $g_{2k-1}^i$ and $g_{2k}^i$ to form $g^{i+1}_k$. The slow directions of $f_{2k-1}^i$, $f_{2k}^i$, and $f^{i+1}_k$ are $$(-\sin\theta_{2k-1}^i, \cos\theta_{2k-1}^i), (-\sin\theta_{2k}^i, \cos\theta_{2k}^i), \text{ and } (-\sin\theta^{i+1}_k, \cos\theta^{i+1}_k)$$

respectively, where $\theta^{i+1}_k$ is the average $\theta_{2k-1}^i$ and $\theta_{2k}^i$. Sample points are represented in the diagrams by black dots. $g^{i+1}_k$ has more sample points in its slow direction than $g_{2k-1}^i$ and $g_{2k}^i$ do in theirs. The distance between sample points in the fast direction, indicated in the diagrams by the distance between adjacent solid lines, is always d. As explained above, the low computational complexity of the algorithm depends on the judicious choice of sample point spacing, and hence, the number of sample points, in a grid's slow direction. This spacing is chosen based on the following reasoning.

Since at every merge level i, two consecutive functions $f_{2k-1}^{i-1}$ and $f^{i-1}_{2k}$ from the previous level are added to form $f_k^i$, it follows that $2^i$ consecutive original functions $f_j^0$ were added, step by step, to obtain $f_k^i$. These $2^i$ original functions are referred to as the merged original functions. The slow directions of any two consecutive original functions $f_j^0$ and $f_{j+1}^0$ differ by $\pi/Q$ radians, and it follows from this that the slow directions of the first and last of the merged original functions differ by $(2^i-1)\pi/Q$ radians. It is trivial to show that the slow direction of $f_k^i$ is halfway between the slow directions of the first and last merged original functions, and thus it differs by no more than $(2^i-1)\pi/(2Q)$ from the slow direction of any of the merged original functions.

For any $f_k^i$, the fast direction is perpendicular to the slow direction and the spacing in the fast direction is d. Preferable spacing is selected in the slow direction in such a way that interpolating between two adjacent sample points A and B on a single line parallel to the slow direction would have an error no greater than the error incurred by interpolating between adjacent sample points in any of the merged original functions. The spacing in the slow direction should therefore be such that if a line parallel to the fast direction of any of the merged original functions is used as a coordinate axis, then the distance along this coordinate axis between A and B will be no more than d. It can be seen from FIG. 4 that the desired distance between adjacent points in the slow direction of $f_k^i$ is therefore $$\frac{d}{\sin((2^i-1)\pi/(2Q))}.$$

Figure 4:
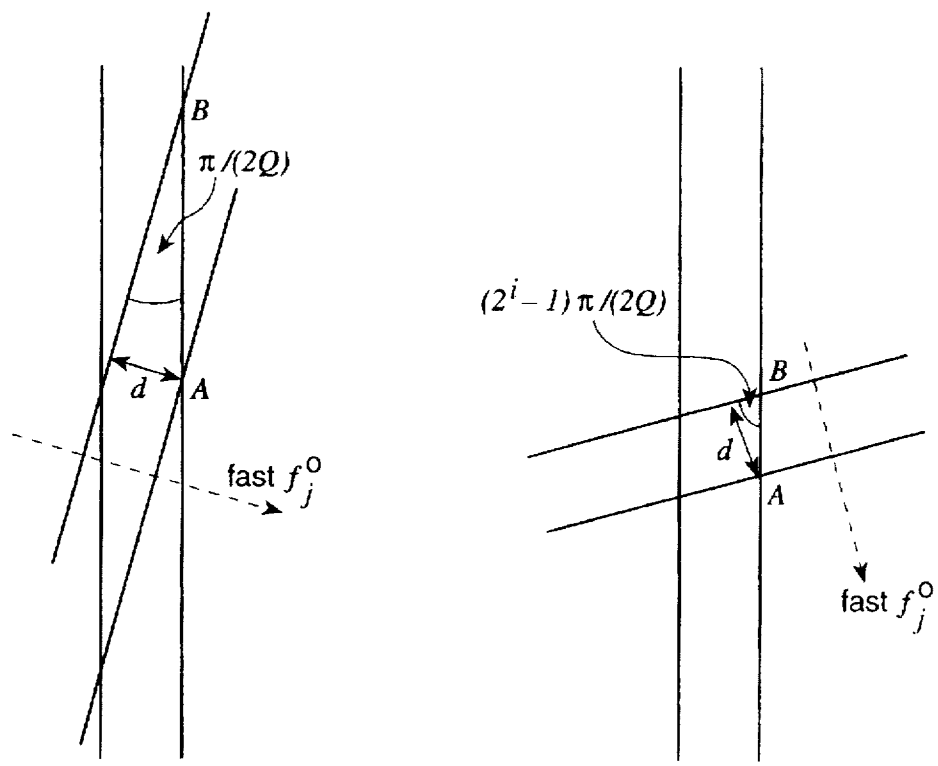
FIG. 4 shows a choice of spacing in the slow direction according to a preferred embodiment of the present invention.

FIG. 4 illustrates choice of spacing in the slow direction. The angular difference in radians between the slow direction (vertical lines) of the function $f_k^i$, currently being formed, and the slow direction (solid diagonal lines) of any of the merged original function is never greater than $(2^i-1)\pi/(2Q)$. The fast direction of the merged original function is perpendicular to its slow one and its spacing in that direction is d. The distance in that direction between adjacent sample points A and B of $f_k^i$ should not exceed d. On the left, the first merge level is shown. On the right, an arbitrary merge level i is shown.

Since the diameter of the support of the reconstruction is Nd, the number of sample points necessary along a single line in the slow direction of $f_k^i$ is Nd divided by the sampling interval, or $$N\sin((2^i-1)\pi/(2Q)).$$

Let us assume that if this number is not an integer then the lowest integer greater than this number will be used. Since the sample spacing in the fast direction is always d, it follows that for any i and j, there are N lines parallel to the slow direction along which $f_j^i$ will be sampled, so the total number of points in $g_j^i$ is $$N\lceil N\sin((2^i-1)\pi/(2Q))\rceil.$$

Also, there are $Q/2^i$ different grids $g_j^i$ to be computed (i.e., at the ith level of merges, j takes the values $1, \ldots, Q/2^i$). It follows from this that the total number of point values to be computed and stored at the ith level of merges is $$\left\lceil N\sin\left((2^i-1)\frac{\pi}{2Q}\right)\right\rceil\left(\frac{NQ}{2^i}\right) < \left(N\sin\left(\frac{2^i\pi}{2Q}\right)+1\right)\left(\frac{NQ}{2^i}\right) < \left(N\frac{2^i\pi}{2Q}+1\right)\left(\frac{NQ}{2^i}\right) = \frac{\pi}{2}N^2 + \frac{NQ}{2^i}.$$

The sum of this for all levels of merges, i.e., for $i=1, \ldots, \log_2 Q$, is less than $$\frac{\pi}{2}N^2\log_2 Q + NQ.$$

If, as is normally assumed, $Q \approx N$, then the order of the backprojection is $N^2\log N$.

During implementation of this algorithm some practical issues should be considered. For $i=1, \ldots, \log_2 Q$, samples of $f_l^i$ are computed from $g_{2l-1}^{i-1}$ and $g^{i-1}_{2l}$ by interpolation, but there will generally be some points where $f_l^i$ is to be sampled that are not surrounded by sample points of $f_{2l-1}^{i-1}$ or of $f^{i-1}_{2l}$, and extrapolation must be performed there instead of interpolation. Computing a few samples of $f^i_l$ just outside the disk in which the image is to be reconstructed will reduce the number of points at which extrapolation is necessary at the (i+1)-th level, but will in itself require extrapolation unless a sufficient number of samples at points outside the disk were computed at the (i−1)-th level. A scheme with the same computational complexity is conceivable in which at each level of grid merging, sample points outside the disk are chosen in such a way that extrapolation is never required.

In the present implementation, one more than the $$\lceil N \sin((2^i-1)\pi/(2Q))\rceil$$

points per line in the slow direction prescribed above is used, so that the first and last sampling points on each line would be at or beyond the boundary of the disk supporting the reconstruction. This does not change the computational complexity.

We have found empirically that image quality can be improved by doubling the number of samples per Radon projection by interpolation, or by doubling the number of projections (i.e., the number of angles at which projections are computed) by interpolation. A more efficient way to improve image quality is to sample $f_i^j$ for all i and j at no fewer than 5 points in the slow direction, although the expression for the desired distance between adjacent points would imply that fewer sample points are necessary in the slow direction in the first few levels of merges. In any case, neither of these adjustments are necessary when the Post-processing correction method described below is applied.

Images resulting from the multiscale backprojection algorithm as described up to this point are somewhat blurred due to the many interpolations necessary. The point spread function of the algorithm is wider than that of the classical backprojection. We have found that an $O(N^2)$ Fourier domain correction of the image greatly reduces the width of the point spread function of the multiscale backprojection and enhances the resulting images. A similar correction can be performed after the classical backprojection, but with less of an improvement, and images produced by the multiscale method with Fourier domain correction are at least as good qualitatively as those produced using the classical backprojection with Fourier domain correction.

If the point spread function of a given backprojection method were shift invariant, then the obvious correction would be to divide the Fourier transform of the reconstruction by that of the point spread function and to take the inverse Fourier transform of the result. However, the point spread functions of both the classical and multiscale backprojection methods vary slightly over the image. Postprocessing correction herein consists of dividing the Fourier transform of the reconstruction by a Gaussian which approximates the Fourier transforms of the point spread functions obtained at various points in the image. The division is performed in a disk around the origin of the Fourier plane. Outside this disk, i.e., for higher frequencies, the Fourier transform of the reconstruction is retained, and no division is performed. The width of the Gaussian is chosen in such a way as to optimize this approximation. As we will show, this technique is more effective for the multiscale backprojection than for the classical one, as the point spread functions obtained for the multiscale method can be more closely approximated by a Gaussian.

For each of the two methods under consideration (the classical and multiscale backprojection methods), the 2-D Gaussian was found which fit a selection of point responses better than any other 2-D Gaussian. More precisely, the 2-D Gaussians are of the form $$e^{-(x^2+y^2)/\sigma^2},$$

where the width $\sigma>0$ of the Gaussian may be chosen arbitrarily. In the context of the present invention, x and y may be regarded as pixel coordinates (i.e., the x coordinates of horizontally adjacent pixels differ by 1, and the y coordinates of vertically adjacent pixels differ by 1), and then the goal was to choose the value $\sigma_o$ of $\sigma$ for which the resulting Gaussian best fit a selection of point responses in the following sense.

The point responses were all represented by real-valued matrices. These matrices were averaged, and the central 7×7 submatrix A, with the peaks of the point responses at its center, was extracted and normalized. Let the indices i and j of A run from −3 to 3. Let $$m_{ij}(\sigma)=e^{-(i^2+j^2)/\sigma^2}.$$

For each method, $\sigma_o$ is defined as the value of $\sigma$ which minimizes $$\sum_{i,j=-3}^{3}(A_{ij}-m_{ij}(\sigma))^2.$$

Figure 5:
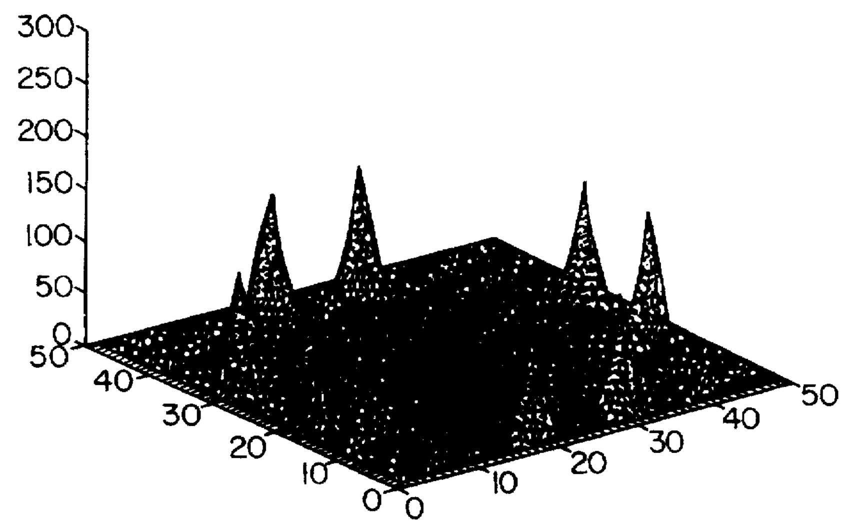
FIG. 5 shows the eight-fold symmetry of the Radon transform—convolution backprojection sequence according to a preferred embodiment of the present invention.

Let us assume that backprojection is performed on a square grid of pixels, or on a circular central region of this square. The computation of the Radon projections of the image contained in this grid, and the convolution and backprojection of the Radon projections back on to the grid, can be performed in such a way that the entire sequence of operations is symmetric with regard to the horizontal and vertical axes of the grid and its two diagonals. In such a case, a point response anywhere in the grid is identical, up to rotation and reflection, to as many as seven other point responses, whose positions are obtained from the position of the original point response by reflection across one or more of the axes of symmetry of the operations. See FIG. 5. As shown in FIG. 5, a point response of the Radon transform-CB sequence is identical, up to rotation and reflection, to as many as seven other point responses. It follows that when selecting positions on the grid at which to compute point responses for the purpose of computing $\sigma_o$, one may restrict the positions to a single octant of the grid and compute the point responses at those positions, and then the point responses at the corresponding positions in the other seven octants can be obtained by rotating and reflecting the computed point responses.

In our research, point responses were computed at 15 randomly selected points in a single octant, and the point responses at the corresponding points in the remaining octants were obtained by rotation and reflection of the original 15 point responses, as explained above.

Point responses and the resulting value of $\sigma_o$ depend on the process by which the Radon projections are obtained. In our research, Radon projection data were computed in software, but an apparatus implementing the method described here might obtain the projection data from physical measurements. In any case, for any such apparatus, $\sigma_o$ should be computed from point responses generated by Radon data obtained from the source from which the apparatus will obtain the Radon data in practice.

Figure 6:
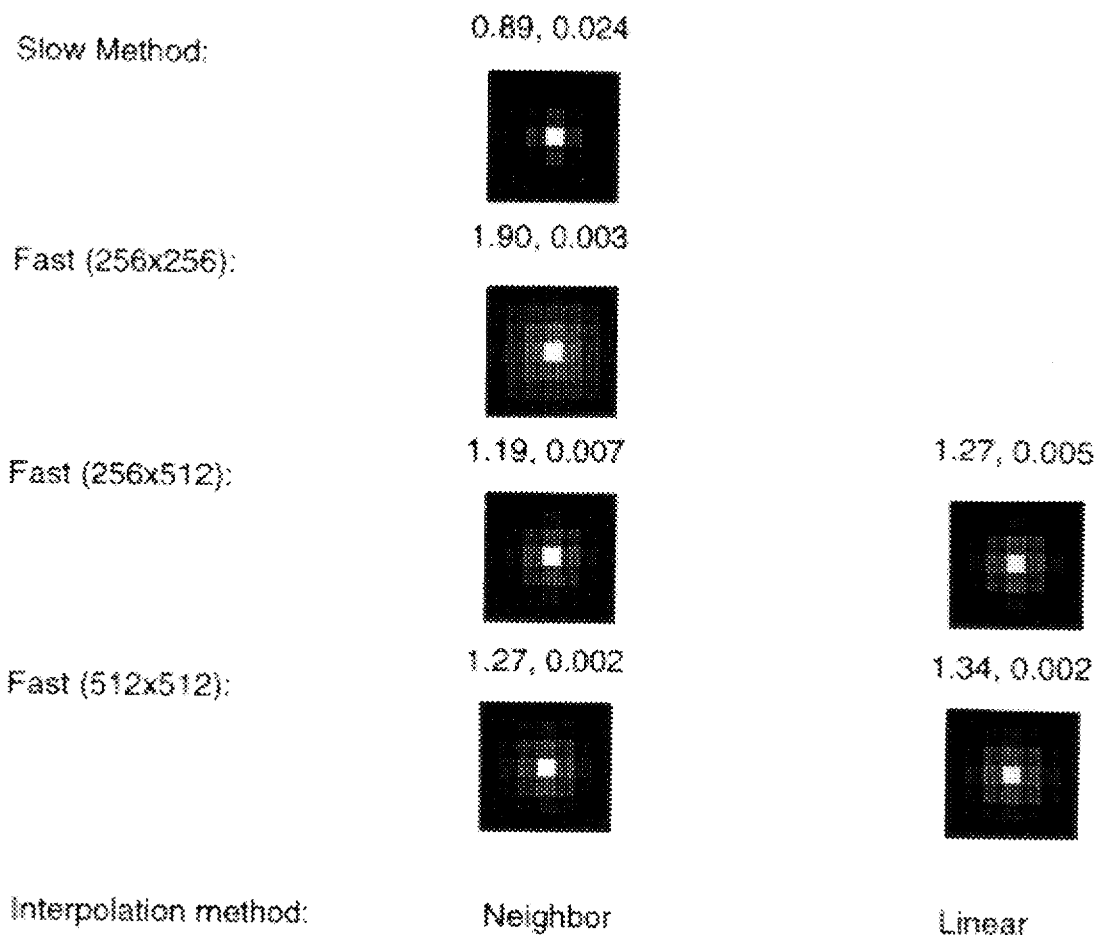
FIG. 6 shows optimal values of the Gaussian width according to a preferred embodiment of the present invention.
Figure 7A:
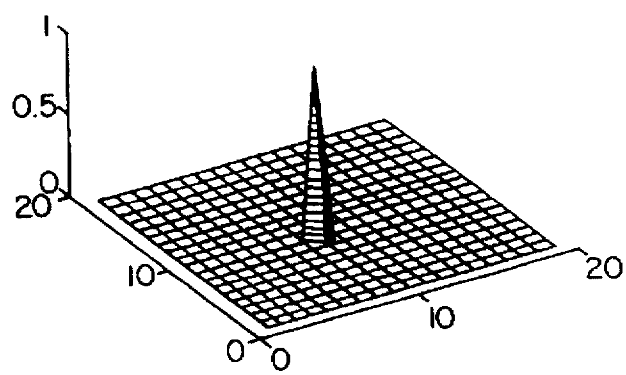
FIG. 7 shows surface plots of point spread functions for the classical and multiscale backprojection methods and surface plots of their Fourier transforms.
Figure 7B:
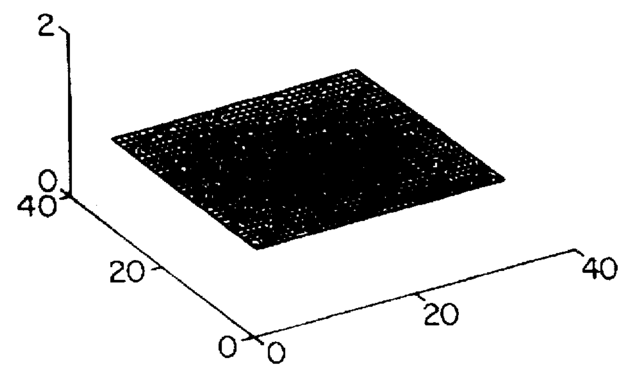
Figure 7C:
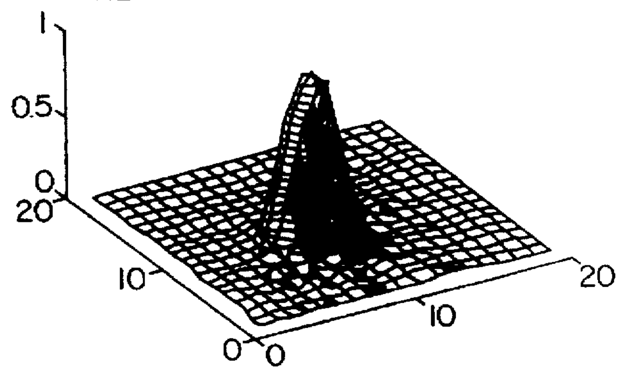
Figure 7D:
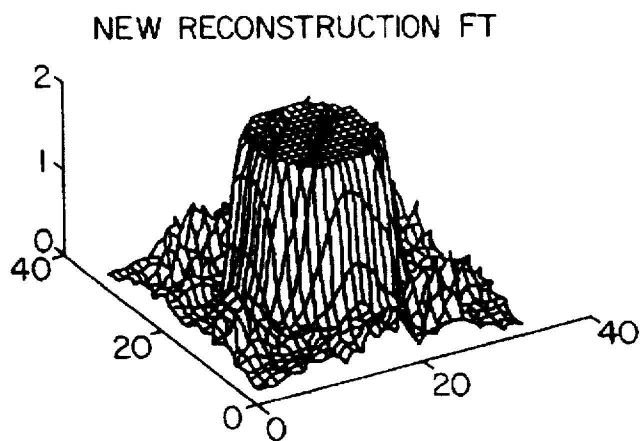
Figure 7E:
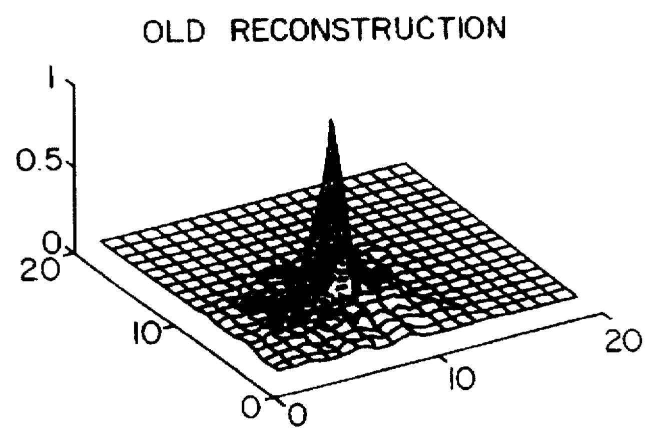
Figure 7F:
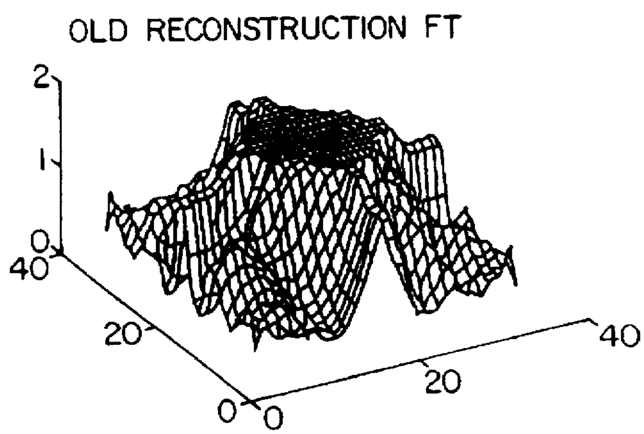

FIG. 6 indicates the optimal value of $\sigma$, and the degree to which the resulting Gaussian fits the point responses, for the classical backprojections and several variants of the multiscale backprojection. Over each point response grayscale image is displayed a pair of numbers. The first is the optimal value $\sigma_o$ of $\sigma$ for the method, and the second is the error $\epsilon$ given by $$\epsilon = \max_{i,j=-1,\ldots,1} |A_{ij} - m_{ij}(\sigma_o)|.$$

It can be seen that while $\sigma_o$ is greater for the multiscale backprojection than for the classical backprojection, implying that multiscale backprojection without postprocessing has a wider point response and therefore produces blurrier images, the multiscale method point responses can be approximated better by a Gaussian, and therefore the multiscale backprojection with postprocessing can produce sharper images than the classical backprojection with postprocessing.

FIG. 7 shows surface plots of point spread functions for the classical and multiscale backprojection methods and surface plots of their Fourier transforms. It can be seen from these figures that although the uncorrected multiscale backprojection products a wider point spread than the classical method, the Fourier transform of the multiscale point spread function more closely resembles a Gaussian than the Fourier transform of the classical point spread function. It follows that the multiscale method better lends itself to the postprocessing correction described here than does the classical method.

The correction just described as a postprocessing correction can also be effected during the convolution step instead of requiring a post-processing step, based on the following. It follows easily from the Radon Slice Theorem (2) that $$\frac{\widehat{P_\theta f}(\rho)}{e^{-\rho^2/\sigma_o^2}} = \frac{\sqrt{2\pi}\,\hat{f}(\rho\cos\theta, \rho\sin\theta)}{e^{-((\rho\cos\theta)^2+(\rho\sin\theta)^2)/\sigma_o^2}}$$

Thus the postbackprojection procedure of dividing by the 2-D discrete Fourier transform of $e^{-(x^2+y^2)/\sigma_o^2}$ in the disk in the Fourier domain defined by $x^2+y^2 \leqq R^2$ may be replaced by division of $\widehat{P_\theta f}(\rho)$ by the 1-D discrete Fourier transform of $e^{-x^2/\sigma_o^2}$ in the inverval defined by $\rho^2 \leqq R^2$. This method of applying the correction may be preferred in many cases as it does not require introduction of an entire additional step and also does not require the amounts of data storage necessary for a 2-D discrete Fourier transform.

It is important to note that the computations of $\sigma_0$, of the 2-D discrete Fourier transform of $e^{-(x^2+y^2)/\sigma_o^2}$, and of the 1-D discrete Fourier transform of $e^{-x^2/\sigma_o^2}$ can be done "off-line", that is, they can be done before sensor data are read in for the purpose of reconstruction, and therefore it is only the division of the 2-D discrete Fourier transform of the image by the 2-D discrete Fourier transform of $e^{-(x^2+y^2)/\sigma_o^2}$ or the division of $\widehat{P_\theta f}(\rho)$ by the 1-D discrete Fourier transform of $e^{-x^2/\sigma_o^2}$ that by necessity add to the amount of time the method will require to effect the reconstruction.

Figure 9:
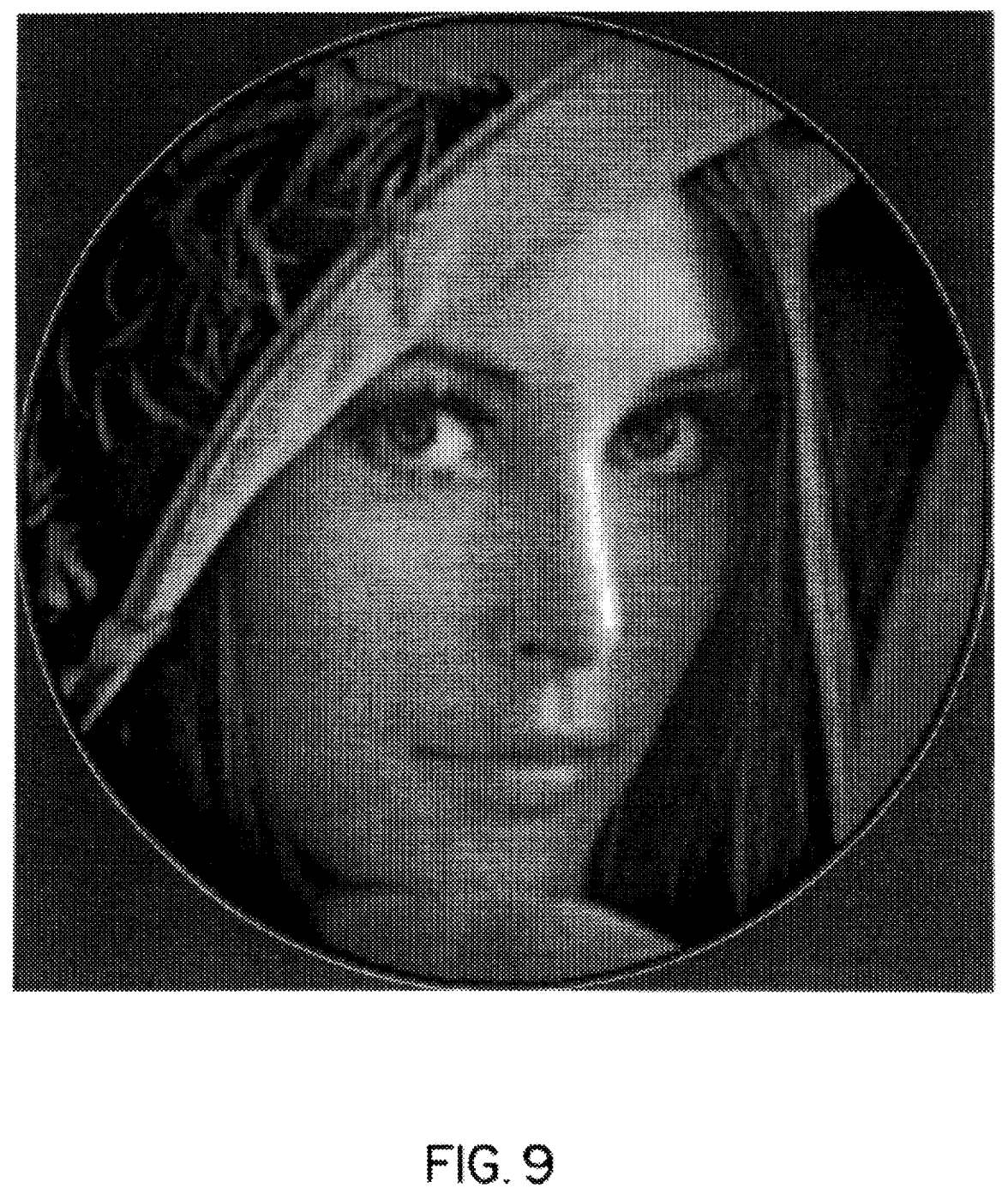
Figure 10:
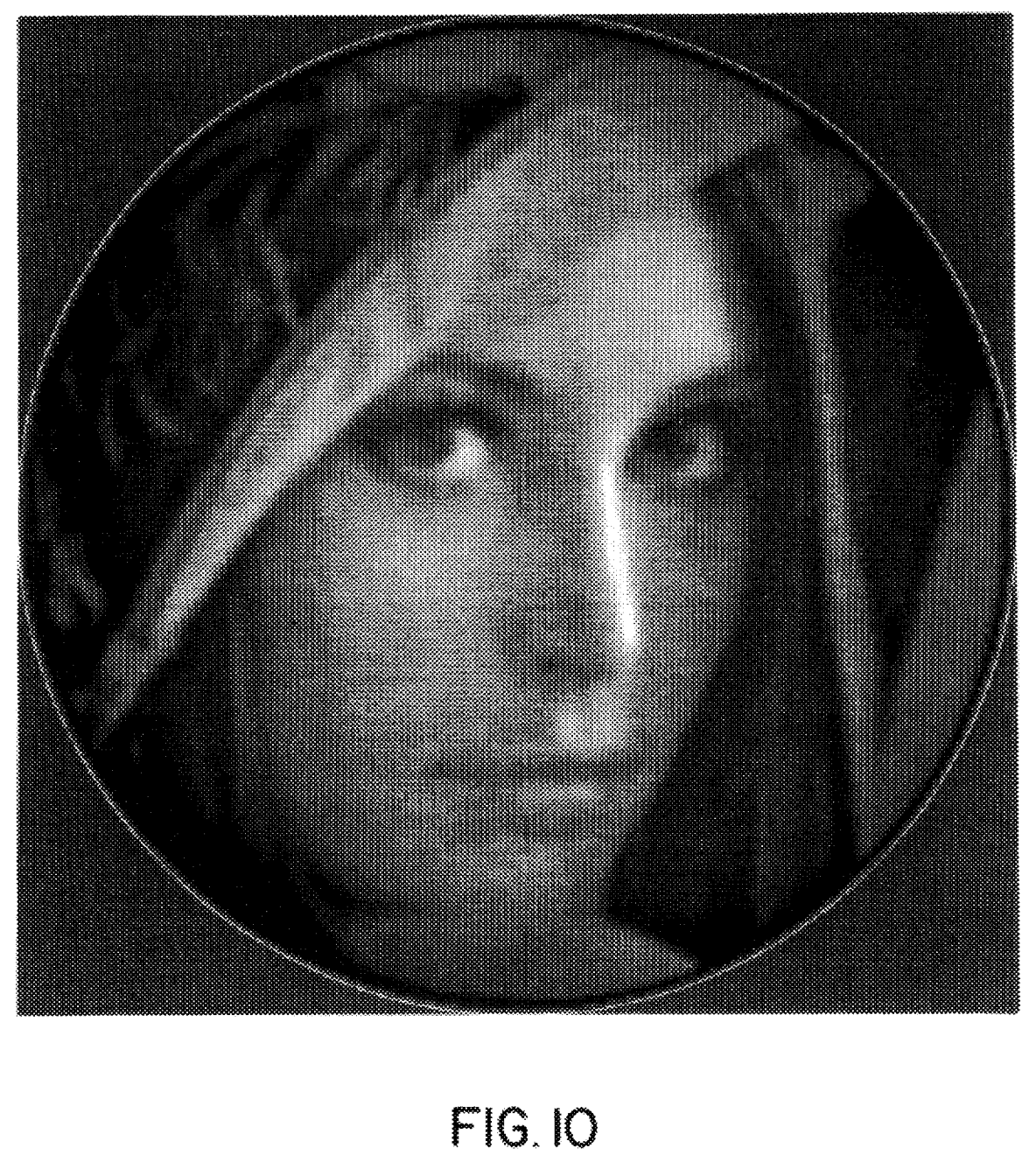
Figure 12:
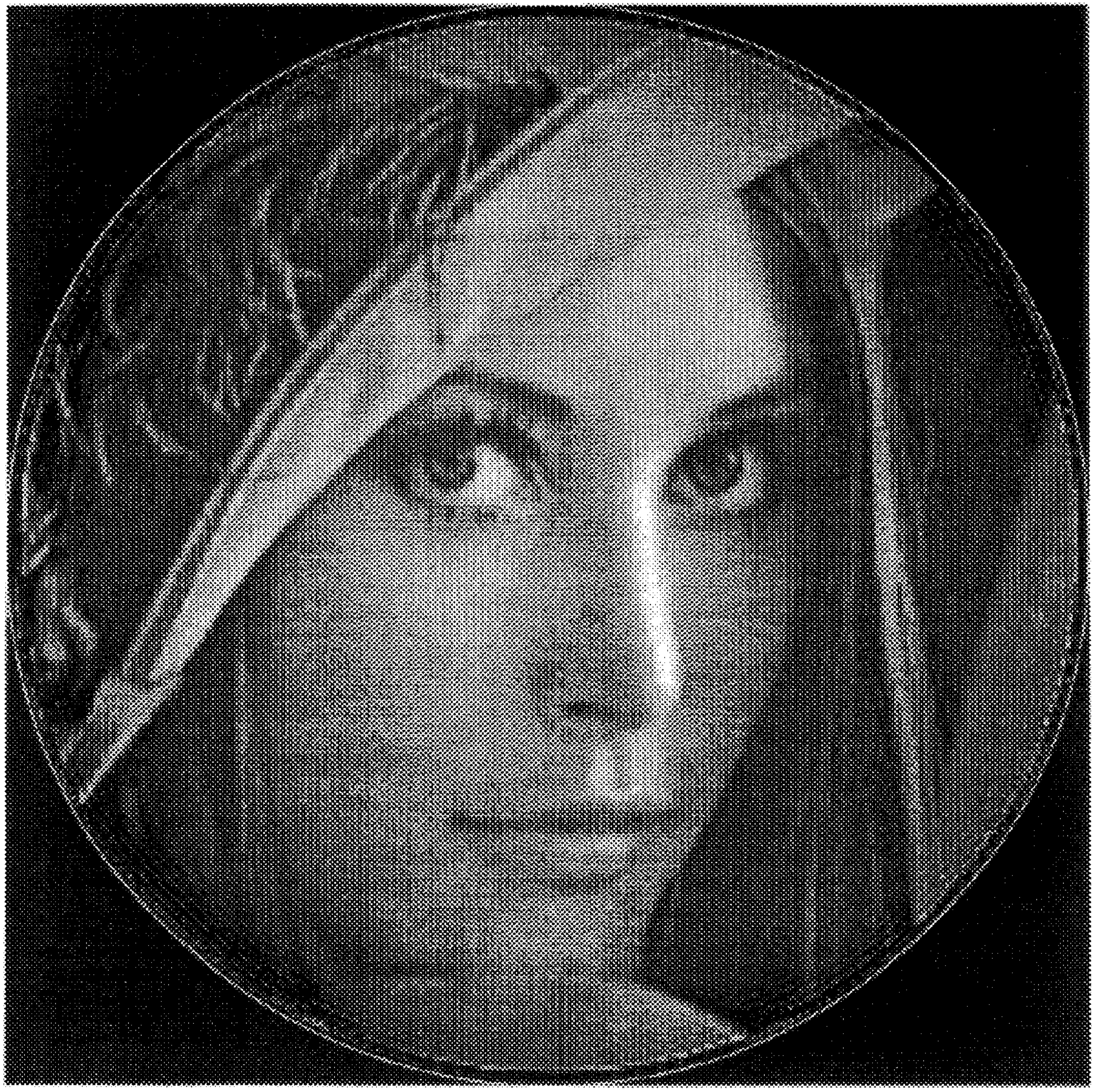
FIG. 12 shows the results of CB with multiscale backprojection, without doubling of the data but with postprocessing according to a preferred embodiment of the present invention.

FIG. 8 shows an image from which Radon data were computed for the purpose of testing different variations of CB. FIG. 9 shows the results of CB with classical backprojections. FIG. 10 shows the results of CB with multiscale backprojection without postprocessing but with doubling of the data by means of interpolations. FIG. 12 shows the results of CB with multiscale backprojection, without doubling of the data but with postprocessing.

Although the invention has been shown and described in terms of a specific preferred embodiment and variants, changes and modifications are possible which do not depart from the spirit, scope, or contemplation of the inventive concepts disclosed and taught herein. Such are deemed to fall within the purview of the invention as claimed.

What is claimed is:

1. A method of computerized tomography, comprising the steps of:

(a) scanning a subject by projecting radiation toward the subject;

(b) sensing the projected radiation with a plurality of sensors;

(c) processing the output of the sensors to create a matrix of samples of an image by:

(d) filtering the samples of each Radon projection sample vector $r^i$, where $i=1, \ldots, Q$, by:

i. computing the discrete Fourier transform $\hat{r}^i$ of $r^i$ using an algorithm of order N log N, where N is the length of the vector;

ii. multiplying the jth element of $\hat{r}^i$ by j, for $j<N/2$, and multiplying the jth element of $\hat{r}^i$ by $N-j$, for $j \geqq N/2$, where the elements of $r^i$ are numbered 0 through $N-1$; and iii. computing the inverse discrete Fourier transform $g_i^0$ of the modified $r^i$ using an algorithm of order N log N; and (e) performing the kth level of merges, for $k=1, \ldots \log_2 Q$, by computing the grid $g_l^k$, for $l=1, \ldots, Q/2^k$, by merging $g_{2l-1}^{k-1}$ and $g^{k-1}_{2l}$ by means of rotation of coordinates, interpolation, and addition.

2. The method of claim 1 wherein the algorithm to compute the discrete Fourier transform is the FFT algorithm and the algorithm to compute the inverse discrete Fourier transform is the IFFT algorithm.

3. The method of claim 1 wherein the number of samples in each Radon projection vector $r^i$ is increased by means of interpolation, and/or the number of Radon projection vectors $r^i$ is increased by means of interpolation, before the step of computing the discrete Fourier transform is computed.

4. The method of claim 1, wherein the number of samples of each vector $g_i^0$ is increased by means of interpolation, and/or the number of vectors $g_i^0$ is increased by means of interpolation, after the step of computing the inverse discrete Fourier transform is performed.

5. The method of claim 1 wherein the vector $\hat{r}^i$ is multiplied by a weighting function in the step of (d) ii.

6. A method of computerized tomography comprising the steps of:

(a) scanning a subject by projecting radiation toward the subject;

(b) sensing the projected radiation with a plurality of sensors;

(c) processing the output data of the sensors to create a matrix of samples of an image by:

(d) convolution and backprojection of the output data;

(e) computing a selection of the point spread functions produced by the Radon transform-convolution-backprojection suite;

(f) computing the width $\sigma_o$ of the Gaussian that most closely fits the computed point spread functions according to a matching mathematical criterion;

(g) computing G, the 2-D discrete Fourier transform of the N×N of samples of the Gaussian of width $\sigma_o$ using an algorithm of order no greater than $N^2\log N$;

(h) computing the 2-D discrete Fourier transform of the N×N image matrix using an algorithm of order $N^2\log N$;

(i) dividing each component of the resulting matrix by the corresponding sample of G, with treatment of components at which G is near zero;

(j) computing the inverse 2-D discrete Fourier transform of the resulting matrix.

(k) displaying the results on a visual display.

7. The method of claim 6 wherein steps (h) through (j) are omitted and the function $\widehat{P_\theta f}(\rho)$ of the convolution is divided by the discrete Fourier transform of $e^{-x^2/\sigma_o^2}$ for all $\rho$ such that $\rho^2 \leqq R^2$ for some R.

8. A computerized tomography scanner, comprising:

(a) means for scanning a subject by projection thereof with a source of radiation;

(b) means for sensing the projected radiation with a plurality of sensors on the side of the subject opposite the source of radiation;

(c) means for processing the output of the sensors to create a matrix of samples of an image, including (d) means for computing the discrete Fourier transform $\hat{r}^i$ of $r^i$ using any algorithm of order N log N, where N is the length of the vector, (e) means for multiplying jth element of $\hat{r}^i$ by j, for j<N/2, and multiplying the jth element of $\hat{r}^i$ by N−j, for j≧N/2, where the elements of $\hat{r}^i$ are numbered 0 through N−1;

(f) means for computing the inverse discrete Fourier transform $g_i^O$ of the modified $\hat{r}^i$ using any algorithm of order N log N;

(g) means for computing grid $g_l^k$, for l=1, . . . , Q/$2^k$, by merging $g_{2l-1}^{k-1}$ and $g^{k-1}{}_{2l}$ by means of rotation of coordinates, interpolation, and addition; and (h) means for creating a visual display of the matrix of samples.

9. The apparatus of claim 8, wherein the means for computing the discrete Fourier transform is the FFT algorithm and the means for computing the inverse discrete Fourier transform is the IFFT algorithm.

10. The apparatus of claim 8, wherein the number of samples in each Radon projection vector $r^i$ is increased by means of interpolation, and/or the number of Radon projection vectors $r^i$ is increased by means of interpolation, before computing the discrete Fourier transform.

11. The apparatus of claim 8, wherein the number of samples of each vector $g_i^O$ is increased by means of interpolation, and/or the number of vectors $g_i^O$ is increased by means of interpolation, after computing the inverse discrete Fourier transform.

12. The apparatus of claim 8, wherein the vector $\hat{r}^i$ is multiplied by a weighting function in means for multiplying.

13. A computerized tomography scanner, comprising:

(a) means for scanning a subject by projection of radiation;

(b) means for sensing the projected radiation with a plurality of sensors;

(c) means for processing the output data of the sensors to create a matrix of samples of an image, including;

(d) means for computing the convolution and backprojection of the output data;

(e) means for computing a selection of the point spread functions produced by the Radon transform-convolution-backprojection suite;

(f) means for computing the width $\sigma_o$ of the Gaussian that most closely fits the computed point spread functions according to a mathematical criterion;

(g) means for computing G, the 2-D discrete Fourier transform (2DDFT) of the N×N matrix of samples of the Gaussian of width $\sigma_o$;

(h) means for computing the 2-D discrete Fourier transform of the N×N image matrix using any algorithm of order $N^2$logN;

(i) means for dividing each component of the resulting matrix by the corresponding sample of G, with treatment of components at which G is near zero;

(j) means for computing the inverse 2-D discrete Fourier transform of the resulting matrix; and (k) means for converting the matrix data to a visual display.

14. A computer readable memory medium encoded with data representing a computer program for use with a computerized tomography scanner and a computer to generate a visual image by:

(a) filtering samples of Radon projection sample vectors $r^i$, where i=1, . . . , Q, by:

i. computing the discrete Fourier transform $\hat{r}^i$ of $r^i$ using an algorithm of order N log N, where N is the length of the vector;

ii. multiplying the jth element of $\hat{r}^i$ by j, for j<N/2, and multiplying the jth element of $\hat{r}^i$ by N−j, for j≧N/2, where the elements of $\hat{r}^i$ are numbered 0 through N−1; and iii. computing the inverse discrete Fourier transform $g_i^O$ of the modified $\hat{r}^i$ using any algorithm of order N log N; and (b) performing the kth level of merges, for k=1, . . . , $\log_2$Q, by computing the grid $g_l^k$, for l=1, . . . , Q/$2^k$, by merging $g_{2l-1}^{k-1}$ and $g^{k-1}{}_{2l}$ by means of rotation of coordinates, interpolation, and addition.

15. The computer readable memory medium of claim 14 in the form of a floppy disk, an ASIC, computer chip or circuit.

16. The computer readable memory medium according to claim 14 wherein the number of samples in each Radon projection vector $r^i$ is increased by means of interpolation, and/or the number of Radon projection vectors $r^i$ is increased by means of interpolation, before the step of computing discrete Fourier transform is computed.

17. The computer readable memory medium according to claim 14 wherein the number of samples of each vector $g_i^O$ is increased by means of interpolation, and/or the number of vectors $g_i^O$ is increased by means of interpolation, after the step of comprising inverse discrete Fourier transform is performed.

18. The computer readable memory medium according to claim 14 wherein the vector $\hat{r}^i$ is multiplied by a weighting function in the step of multiplying discrete Fourier transform is performed.

19. The computer readable memory medium encoded with data representing a computer program that can cause a computer to function to execute the method of:

(a) computing a selection of the point spread functions produced by the Radon transform-convolution-backprojection suite; p1 (b) computing the width $\sigma_o$ of the Gaussian that best fits the computed point spread functions according to a mathematical criterion;

(c) computing G, the 2-D discrete Fourier transform (2DDFT) of the N×N matrix of samples of the Gaussian of width $\sigma_o$;

(d) computing the 2DDFT of the N×N image matrix using an algorithm of order $N^2$logN;

(e) dividing each component of the resulting matrix by the corresponding sample of G, with special treatment of components at which G is near zero; and (f) computing the inverse 2-D discrete Fourier transform of the resulting matrix.

20. The computer readable memory medium of claim 19 in the form of a floppy disk, an ASIC, computer chip or circuit.

* * * * *